Jan. 31, 1939.  F. BURDICK ET AL  2,145,474
FISHING REEL
Filed June 1, 1936   3 Sheets-Sheet 2
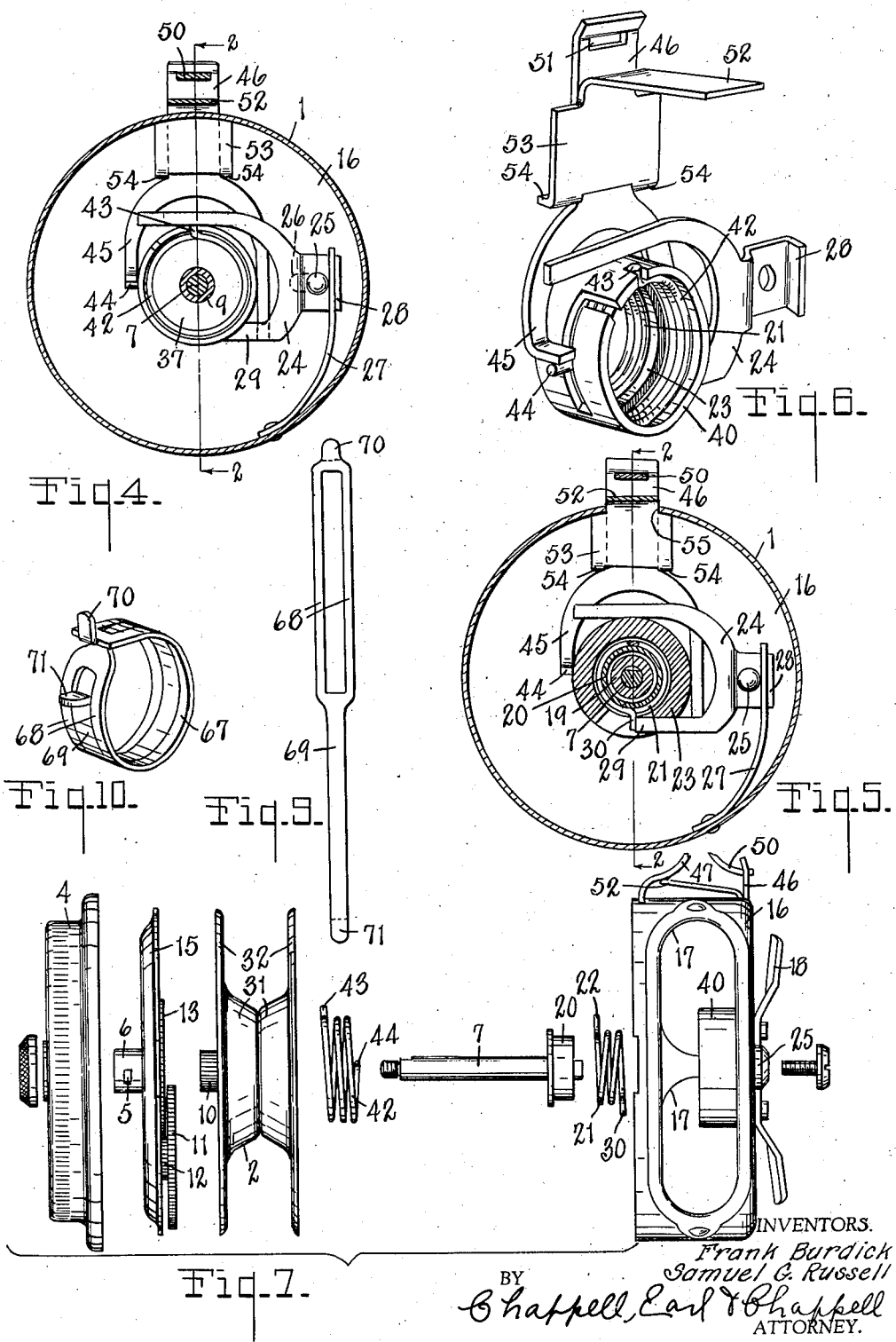
INVENTORS.
Frank Burdick
Samuel C. Russell
BY Chappell, Earl & Chappell
ATTORNEY.

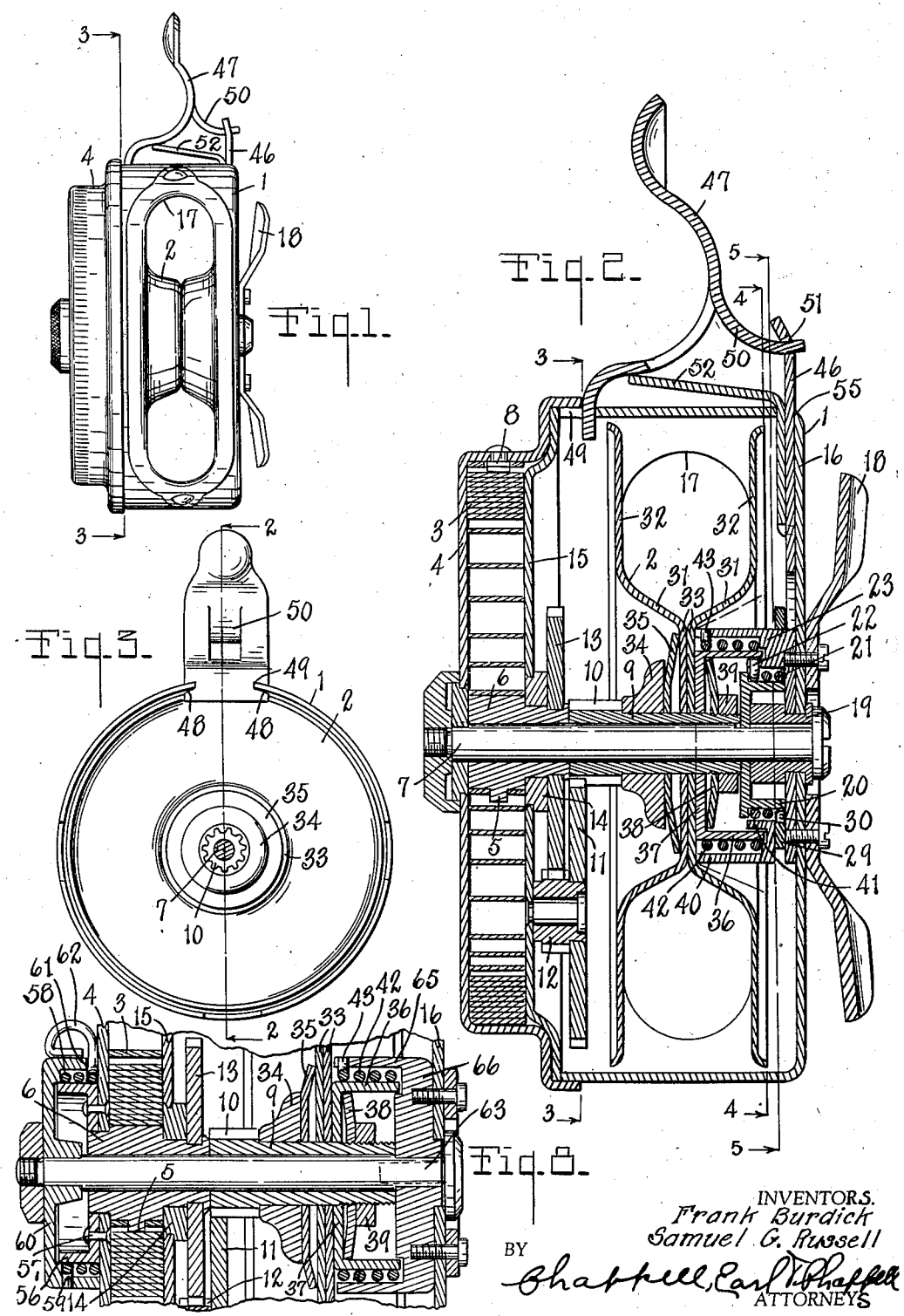

Jan. 31, 1939.  F. BURDICK ET AL  2,145,474
FISHING REEL
Filed June 1, 1936  3 Sheets-Sheet 3

INVENTORS
Frank Burdick
Samuel G. Russell
BY
Chappell, Earl & Chappell
ATTORNEYS Patented Jan. 31, 1939

2,145,474

UNITED STATES PATENT OFFICE 2,145,474

FISHING REEL

Frank Burdick and Samuel G. Russell, Kalamazoo, Mich., assignors to Shakespeare Company, Kalamazoo, Mich.

Application June 1, 1936, Serial No. 82,844

31 Claims. (Cl. 242—84.3)

This invention relates to improvements in fishing reels.

The main objects of this invention are:

First, to provide an improved brake means which facilitates the stripping or permits free stripping of the line from the reel.

Second, to provide a brake which is automatically released by a pull on the line so that the line can be pulled freely from the reel, the brake acting, on releasing tension or pull on the line, to prevent the spring winding up the line until the brake mechanism is manually released.

Third, to provide in a spring winding reel an improved brake mechanism which is compact and simple in structure and very durable in use, the parts being arranged so that the braking strain is minimized.

Fourth, to provide in a spring wind fishing reel an improved ratchet or clutch means for the driving spring.

Fifth, to provide in a fishing reel an improved brake and ratchet means, both of which are highly efficient and silent in operation.

Objects relating to details and economies of the invention will appear from the description to follow. The invention is defined and pointed out in the claims.

Preferred embodiments of the invention are illustrated in the accompanying drawings, in which:

Fig. 1 is a side view of a fishing reel embodying the features of the invention.

Fig. 2 is an enlarged view mainly in section on a line corresponding to line 2—2 of Figs. 3, 4 and 5.

Fig. 3 is a fragmentary view sectioned on line 3—3 of Figs. 1 and 2.

Fig. 4 is a fragmentary view in section on line 4—4 of Fig. 2.

Fig. 5 is a fragmentary view sectioned on line 5—5 of Fig. 2.

Fig. 6 is an enlarged perspective view of the parts of the brake and ratchet mechanism.

Fig. 7 is a disassembled or exploded view showing various parts of the reel in the disassembled relation.

Fig. 8 is an enlarged fragmentary section corresponding to that of Fig. 2 showing a modified form or embodiment of the invention.

Fig. 9 is an extended view of a modified form of brake band.

Fig. 10 is a perspective view of the modified form of brake band.

Figures 11, 12, 13, 14:
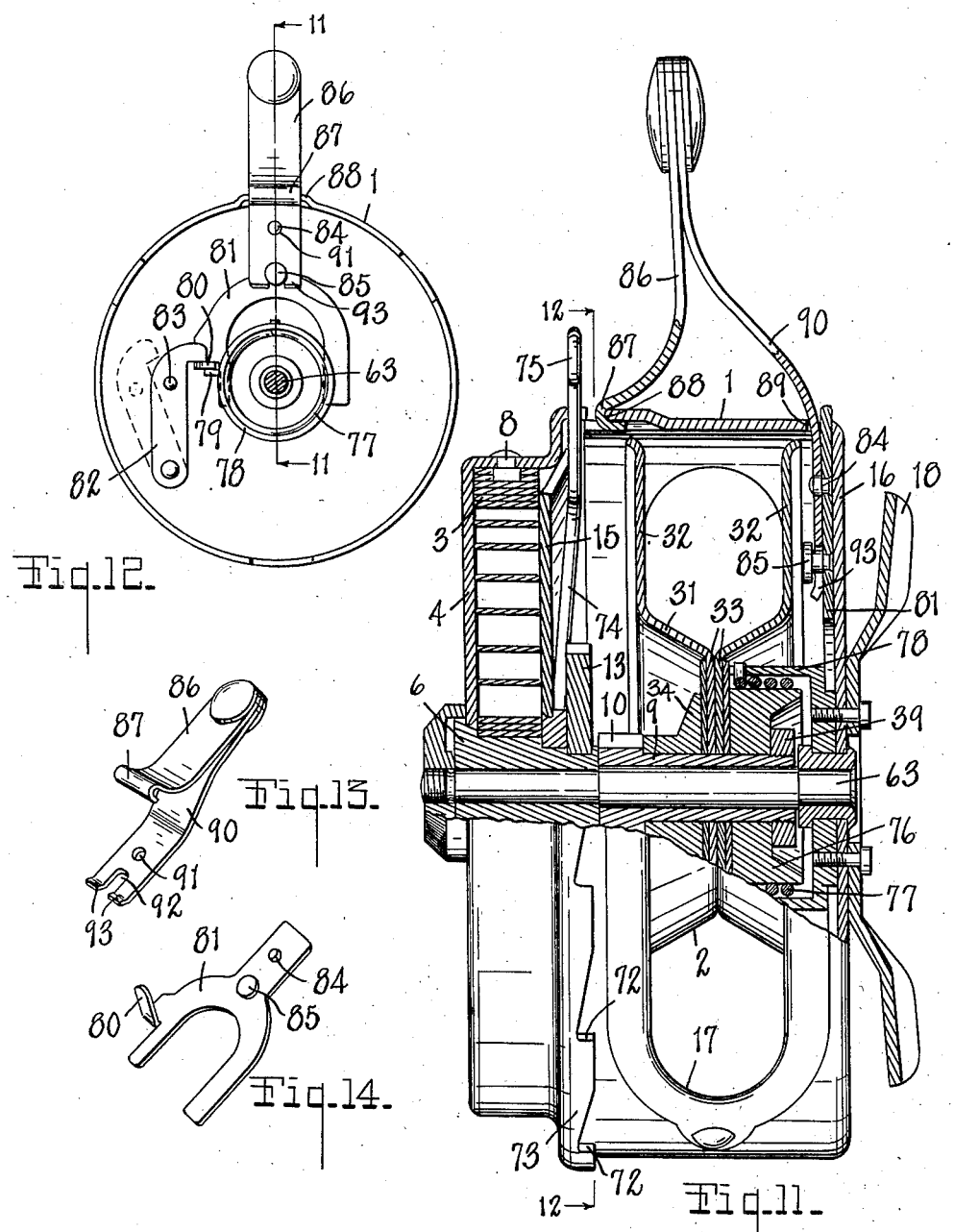
Fig. 11 is an enlarged fragmentary view partially in section on line 11—11 of Fig. 12 of still another form or embodiment of the invention.
Fig. 12 is a detail view partially in section on line 12—12 of Fig. 11.
Fig. 13 is a perspective view of the operating lever.
Fig. 14 is a perspective view of the brake releasing slide.

Referring to the drawings, the embodiment of the invention illustrated comprises a casing or frame designated generally by the numeral 1 and designed to receive the spool designated generally by the numeral 2. The winding or driving spring 3 is housed within the winding drum or spring casing 4 which is rotatably supported relative to the main frame or casing 1. The inner end of the spring is secured by the stud 5 to the hub 6 on the staff 7. The outer end of the spring is secured by the stud 8 to the winding drum or spring casing 4 which is secured on the end of the staff.

The spool 2 is provided with a hub 9 having a pinion 10 preferably cut thereon meshing with a gear 11 secured to the pinion 12 which in turn meshes with the gear 13 on the hub 6 so that the spool is operatively associated with or driven by the spring. The hub 6 is journaled in a bearing 14 carried by the end plate 15 of the casing, the body portion 16 of the casing being, in the embodiment illustrated, of general cup-shape and having side line openings 17.

The frame or casing is provided with a suitable base or reel seat plate 18. The bottom portion of the casing is provided with a bearing 19 for the inner end of the staff.

In the embodiment illustrated, a friction ratchet is provided for the winding spring, this consisting of a drum 20 mounted to rotate with staff 7 and a spirally coiled spring ratchet member 21 embracing the drum, the end of the spring 22 being engaged with a sleeve-like fixed member 23 secured to the frame or casing.

The manually actuated forked slide 24 is slidably supported in the frame and provided with a finger button 25 disposed through the slot 26 in the casing. A spring 27 mounted within the casing engages the upturned end 28 of this slide to hold it in retracted position. The arm 29 of the slide engages the free end 30 of the ratchet member so that by pushing the slide inwardly the coils of the ratchet member are opened to release or disengage the ratchet. The coils of this spring ratchet member are disposed so that the stress of the driving spring acts to engage the ratchet member or force it to clutching position with drum 20.

In the embodiment illustrated, the spool 2 comprises a pair of stampings 31 having offset flange portions 32 and web portions 33 disposed side by side. This provides a spool with side recesses and also provides space for the mounting of the brake means and the friction connecting means for the spool to the hub 9 thereof.

This friction connecting means comprises the hub flange 34 supporting the dished or concaved friction disk 35 at one side of the web 33. At the other side of the web 33 is the brake drum 36 which is provided with a web 37 against the web of the spool members.

A dished or concave friction member 38 is arranged within the drum and coacts with the nut 39 threaded upon the hub, the nut being adjusted to secure the desired frictional engagement or connection for the spool to its hub or driving means. It is intended that this shall be sufficient to normally drive the spool or cause the spool to rotate with the hub, but in the event of extreme loads upon the line the spool can rotate and thereby prevent or minimize breakage of the line, it being intended that the driving friction shall be such as to be slightly under the strength of an ordinary casting line.

It will be noted that the brake drum is positioned in the recess in the side of the spool as is also the sleeve member 23 which has a portion 40 concentric with the brake drum 36 and a portion 41 concentric with the ratchet drum. The coiled spring friction brake member or band 42 is secured at its end 43 to the sleeve, its other or free end 44 being engaged with the arm 45 of the brake releasing slide 46 so that actuation of this slide will cause the brake band to expand and thereby release the drum, the brake band being normally in frictional engagement with the brake drum and its coils being disposed so that the unwinding rotation of the spool acts to release the brake and the winding rotation thereof acts to engage the brake. The concentric portions of the sleeve limit the outward expansion and compel relatively uniform expansion of the coils of the brake band so that it is effectively released. The same is true of the ratchet member.

To conveniently manipulate the slide 46, we provide a finger lever 47 which is notched at 48 to engage the edges 49 of a recess formed in the side wall of the casing. This finger lever is provided with an arm 50 preferably formed integrally therewith which projects through a hole 51 in the brake actuating slide 46.

The spring 52 has an enlarged end 53 arranged within the housing and having spaced lugs 54 embracing the slide 46—see Figs. 3, 4, 5 and 6. Both the spring and the slide are arranged through a hole 55 in the casing so that these parts are assembled and supported without the aid of screws or rivets.

Viewing the parts as shown in Fig. 2, the spring 52 acts to swing the finger lever 47 to the left and to urge the brake releasing slide 46 outwardly. Movement of the lever 47 to the right will force the slide inwardly, thus releasing the brake. The lever 47 is positioned so that it can be conveniently grasped or manipulated with a finger of the hand grasping the rod.

In operation, energy is initially stored in driving spring 3 by winding or rotating casing 4 relative to the main frame to tension spring 3, during which winding step rotation of spool 2 under the influence of the energy thus being stored is prevented through the agency of spring brake member or band 42 which is anchored to sleeve 23 and binds about brake drum 36. The friction disks 35 and 38 transmit this braking action to spool 2. Hub 6 is similarly braked through the further agency of hub 9, pinion 10, gear 11, pinion 12, and gear 13.

During the rotation of the spring casing 4 to wind driving spring 3, movement of the casing reversely of the direction of winding rotation, due to the retractile action of the driving spring, is prevented by the action of spring ratchet member 21 which is anchored in sleeve 23 and binds about ratchet drum 20 to hold the same. Hence, reverse rotation of casing 4 is precluded since both drum 20 and casing 4 are angularly fixed relative to staff 7.

Sufficient energy having been stored in driving spring 3, the manner of using our reel in casting is obvious. The line may be readily stripped from the reel inasmuch as unwinding rotation of the reel releases the brake band. When it is desired to wind the line back on the reel, finger lever 47 is depressed to actuate brake release slide 46 to release the brake band from braking engagement with drum 36, whereupon spring 3, through hub 6, gear 13, pinion 12, gear 11, pinion 10, hub 9, drum 36, and friction disks 35, 38 rotates the spool in rewinding direction.

Should it be desired to release the tension in driving spring 3 without rotating the spool, finger button 25 may be actuated to release spring ratchet member 21 from binding engagement with ratchet drum 20, whereupon drum 20, staff 7, and casing 4 will rotate until the energy in spring 3 is dissipated.

In the embodiment of our invention shown in Fig. 8, the ratchet drum 56 is arranged at the outside of the spring casing or winding drum 4, this ratchet drum being secured to the spring casing by means of a pin 57 or other suitable means. A coiled spring brake band 58 is provided, one end of this spring 59 being anchored in the housing 60 which serves the function of the sleeve 23 of the structure described. The free end of the ratchet member projects through a slot 61 in the housing 60 and is formed into a finger piece 62 by means of which the ratchet may be released to permit rotation of the spring winding drum or casing for the unwinding of the spring. This housing is secured to the staff 63 which in this instance is non-rotatable. The brake is substantially that described with the exception that its sleeve 65 is modified, as its only function is to cooperate with the brake. In this embodiment, the sleeve is a part of the support 66 for the inner end of the staff.

In the embodiment shown in Figs. 9 and 10, the brake band 67 is formed of flat stock or a strap-like piece having a portion made up of two spaced band members 68 and band member 69 which, when the brake band is rolled up, lies between the members 68, as shown in Fig. 10, thus providing a multiple gripping band. The end or lug 70 is anchored to a fixed part while the lug 71 is provided to be engaged by a suitable releasing member such as that shown, a thrust in the proper direction on the member 71 tending to open up or release the brake band.

In the embodiment of our invention illustrated in Figs. 11 to 14 inclusive, the spring casing 4 is provided with a series of ratchet teeth 72 on the edge of its flange 73, a manually released spring pawl 74 being mounted within the casing to project therefrom for manual release and to coact with the teeth 72. The projecting end has a finger piece 75. When it is desired to release the spring, this pawl is pressed inwardly which releases the spring casing. The brake drum 76 is arranged in operative relation to the spool and a coiled spring 77 provided to coact therewith. One end of this spring is anchored to the member 78, the free end of the spring 79 being engaged by the lug 80 on the forked slide 81.

To limit the outward movement of the slide, we provide a pivoted catch or stop 82. This is detachably engageable with a pin 83. The slide 81 is provided with longitudinally spaced studs 84 and 85, the stud 85 being provided with a head. The brake releasing lever 86 has a hook 87 at its end engaged on the outwardly offset fulcrum 88 in the casing, the casing being notched to receive the hook and the fulcrum portion being outwardly offset so that the end of the hook does not interfere with the spool or project into the casing. Transversely aligned with this fulcrum or lever supporting portion 88 is a slot 89 through which the end of the slide projects and which receives the spring 90 secured to the outer end of the lever and having a hole 91 therein engaged with the stud 84 and a slot 92 engaged with the headed stud 85. The ends of the forks formed by the slot are preferably upturned at 93. The spring 90 acts to hold the lever in engagement with its fulcrum and also acts to retract the brake releasing slide 81. Pressure on the lever toward the right as viewed in Fig. 11 will force the slide inwardly and release the brake. The tension of the spring, however, retracts the slide and allows the brake to return to engaging position as soon as the pressure on the lever is released.

This embodiment of actuating means has the advantage of being a simpler structure than that of Fig. 2. The lever does not become disassembled when the spring casing is removed and the spool can be inserted and removed without disassembling the lever. Further, when it is desired to disassemble the lever, it is only necessary to lift its fulcrum end from its supporting fulcrum and disengage the stop 82 from the pin 83 and swing it to released position, as shown by dotted lines. It can be readily manipulated to withdraw it and it is reassembled by reversing the steps.

With the arrangement of parts we have illustrated, we provide a brake means and a ratchet means, both of which are silent in their operation, both of which have large holding capacity and at the same time are easily released. The wear on the parts is nominal and the parts are so arranged that the stresses do not tend to distort or displace them.

A withdrawal pull on the line, or a line which tends to unwind the reel, releases the brake but as soon as the spool tends to rotate in the opposite direction as under the action of the spring when the line is released the brake automatically engages. It may, however, be conveniently released by manual action as through the means of the levers 47 or 86, a relatively slight movement of the lever being sufficient to release the brake. The ratchet may also be released when desired.

In our copending application, Serial No. 100,996, filed September 16, 1936, we disclose and claim a reel generally similar to the embodiments described above, the invention in that case being concerned with improved features of construction relating to a brake release and manually actuable stop therefor as well as to certain details of construction of the ratchet device more particularly pointed out in the claims of the aforesaid copending application.

We have illustrated and described our improvements in highly satisfactory embodiments thereof. We have not attempted to illustrate or describe other embodiments or adaptations thereof as it is believed that this disclosure will enable those skilled in the art to embody or adapt our improvements as may be desired.

Having thus described our invention, what we claim as new and desire to secure by Letters Patent, is:

1. The combination in a spring wind reel, of a spool staff, a spool rotatable on said staff, a driving spring operatively associated with said spool, a winding drum for said spring connected to said staff, a fricton ratchet drum at the other end of said staff rotatable therewith, a brake drum operatively associated with said spool disposed concentrically of said ratchet drum, a fixed sleeve, a spirally coiled spring friction ratchet member secured at one end to said sleeve and embracing said ratchet drum and normally having frictional engagement therewith, the coils of said ratchet member being disposed so that the stress of the driving spring acts to engage the ratchet member with the ratchet drum, a spirally coiled spring brake member secured at one end to said sleeve and normally having frictional clutching engagement with said brake drum, the coils of the brake member being disposed so that the unwinding rotation of the spool acts to release the brake and the winding rotation acts to engage the brake, said sleeve having portions concentric relative to the brake and ratchet drums acting to limit the outward expansion of said ratchet and brake members, a manually operated means associated with the free end of said ratchet member for manually releasing the same, and an independent manually operated means operatively associated with the free end of said brake member for releasing the brake.

2. The combination in a spring wind reel, of a spool staff, a spool rotatable on said staff, a driving spring operatively associated with said spool, a winding drum connected to said spring, means for drivingly connecting the spring with the spool, including a brake drum operatively associated with said spool, a fixed sleeve disposed concentrically to said brake drum, a spirally coiled spring brake member secured at one end to said sleeve and normally having frictional clutching engagement with said brake drum, the coils of the brake member being disposed so that the unwinding rotation of the spool acts to expand the brake member outwardly and release the brake drum from the frictional action of the brake member, and the winding rotation acts to bind the brake member about the brake drum and engage the brake, the said concentric portion of said sleeve acting to limit the outward expansion of said brake member, and a manually operated means operatively associated with the free end of said brake member for releasing the brake drum from binding engagement by the brake member for winding rotation of the spool by the driving spring.

3. The combination in a spring wind reel, of a spool staff, a spool rotatable on said staff, a driving spring operatively associated with said spool, a winding drum for said spring connected to said staff, a brake drum having friction connection with said spool, a fixed sleeve disposed concentrically to said brake drum, a spirally coiled spring brake member secured at one end to said sleeve and normally having frictional clutching engagement with said brake drum, the coils of the brake member being disposed so that the unwinding rotation of the spool acts to expand and release the coils from the brake drum and the winding rotation acts to cause the coils to frictionally bind against the drum and engage the brake, the said concentric portion of said sleeve acting to limit the outward expansion of said brake member, and a manually operated means operatively associated with the free end of said brake member for expanding the brake member and releasing the brake drum for winding rotation of the spool by the driving spring.

4. The combination in a spring wind reel, of a spool staff, a spool rotatable on said staff, a driving spring operatively associated with said spool, a winding drum for said spring connected to said staff, a friction ratchet drum rotatable with said staff, a brake drum having driving connection with said spool, a spirally coiled spring friction ratchet member anchored at one end and embracing said ratchet drum and normally having frictional engagement therewith, the coils of said ratchet member being disposed so that the stress of the driving spring acts to engage the ratchet member, a spirally coiled spring brake member anchored at one end and normally having frictional clutching engagement with said brake drum, the coils of the brake member being disposed so that the unwinding rotation of the spool acts to expand the brake member and release the coils from the brake drum and the winding rotation acts to bind the brake member about the drum and engage the brake, means acting to limit the outward expansion of said ratchet and brake members, a manually operated means associated with the free end of said ratchet member for manually releasing the same, and an independent manually operated means operatively associated with the free end of said brake member for expanding the brake member and releasing the brake drum from binding engagement thereby for winding rotation of the spool.

5. The combination in a spring wind reel, of a spool staff, a spool rotatable on said staff, a driving spring operatively associated with said spool, a winding drum for said spring connected to said staff, a brake drum having driving connection with said spool, a spirally coiled spring brake member anchored at one end and normally having frictional clutching engagement with said brake drum, the coils of the brake member being disposed so that the unwinding rotation of the spool acts to expand the brake member and release the coils from the brake drum and the winding rotation acts to bind the brake member about the drum and engage the brake, means acting to limit the outward expansion of said brake member, and a manually operated means operatively associated with the free end of said brake member for expanding the brake member and releasing the brake drum from binding engagement thereby for winding rotation of the spool.

6. The combination in a spring wind reel, of a spool staff, a spool rotatable on said staff, a driving spring operatively associated with said spool, a winding drum for said spring connected to said staff, a brake drum having driving connection with said spool, a spirally coiled spring brake member anchored at one end and normally having frictional clutching engagement with said brake drum, the coils of the brake member being disposed so that the unwinding rotation of the spool acts to expand the brake member and release the coils from the brake drum and the winding rotation acts to bind the brake member about the drum and engage the brake, and a manually operated means operatively associated with the free end of said brake member for expanding the brake member and releasing the brake drum from binding engagement thereby for winding rotation of the spool.

7. The combination in a spring winding reel, of a spool staff, a spool rotatable on said staff and comprising a hub having a flange thereon, a pair of spool members comprising web-like body portions with outwardly offset flange portions, a concaved friction disk arranged between said flange on said hub and said web portions of said spool, a brake drum disposed at the side of said spool opposite said disk and having a web portion in frictional engagement therewith, a concave friction disk arranged within said drum, said hub being provided with a threaded clamping member in supporting engagement with said second friction disk whereby the parts are secured together and so that the spool members and brake drum are secured for normal rotation with the hub, a fixed sleeve disposed concentrically of said brake drum and within the flange of the spool, a spirally coiled brake band embracing the drum and secured at one end to said sleeve, and manually operated means operatively associated with the free end of said brake band for releasing the brake, said sleeve encircling the band to limit the outward expansion thereof.

8. The combination in a spring winding reel, of a spool staff, a spool rotatable on said staff and comprising a hub having a flange thereon, a pair of spool members comprising web-like body portions with outwardly offset flange portions, a concaved friction disk arranged between said flange on said hub and said web portions of said spool, a brake drum disposed at one side of said spool having a web portion in frictional engagement therewith, a concave friction disk arranged within said drum, said hub being provided with a threaded clamping member in supporting engagement with said second friction disk whereby the parts are secured together and so that the spool members and brake drum are secured for normal rotation with the hub, a spirally coiled brake band embracing the drum and anchored at one end, and manually operated means operatively associated with the free end of said brake band for releasing the brake.

9. The combination in a spring winding fishing reel comprising a spool and a driving spring, the spool comprising a pair of members having webbed central portions and outwardly flared outer portions, a brake drum disposed at one side of said spool and having a web portion engaging a web portion of the spool, a fixed sleeve disposed concentrically of said brake drum, the drum and sleeve lying within the outwardly flared portion of the spool, an outwardly expansible brake band disposed within said sleeve to coact with said drum, the sleeve encircling the band to limit the outward expansion thereof, one end of the brake band being secured to the sleeve, the band being normally in frictional engagement with the drum so that the unwinding rotation of the spool acts to expand the band and release the brake and the winding rotation acts to contract the band and engage the brake, and manually operated means for expanding the band and releasing the brake whereby winding rotation may be imparted to the spool by the driving spring.

10. The combination in a spring winding fishing reel comprising a spool and a driving spring, the spool comprising a pair of members having webbed central portions and outwardly flared outer portions, a brake drum disposed at one side of said spool and having a web portion engaging a web portion of the spool, the drum lying within the outwardly flared portion of the spool, a brake band disposed to coact with said drum, the band being fixedly anchored normally in frictional engagement with the drum so that the unwinding rotation of the spool acts to expand the band and release the brake and the winding rotation acts to contract the band and engage the brake, and manually operated means for expanding the band and releasing the brake whereby winding rotation may be imparted to the spool by the driving spring.

11. The combination in a spring winding fishing reel comprising a spool, a driving winding spring, and means for drivingly connecting the spring and the spool, of a brake means operatively associated with said spool, the spool having a central recess receiving said brake means, said brake means comprising a drum, and a brake band in the form of a coiled spring anchored at one end and cooperating with said drum, means for drivingly connecting said spool and drum, the coils of the brake band encircling the drum so that the unwinding rotation of the spool acts to expand the band and release the brake and the winding rotation acts to contract the band and engage the brake, and manually operated means for expanding the band and releasing the brake whereby winding rotation may be imparted to the spool by the driving spring.

12. The combination in a spring winding fishing reel comprising a spool, a driving winding spring, and means for drivingly connecting the spring and the spool, of a brake means operatively associated with said spool, the spool having a central recess receiving said brake means, said brake means comprising a drum, and a brake band cooperating with said drum, means for drivingly connecting said spool and drum, said brake band being fixedly anchored in the reel and frictionally engaging said drum so that the unwinding rotation of the spool acts to expand the band and release the brake and the winding rotation acts to contract the band and engage the brake, and manually operated means for expanding the band and releasing the brake whereby winding rotation may be imparted to the spool by the driving spring.

13. The combination in a spring winding fishing reel comprising a spool, a driving winding spring, and means for drivingly connecting the spring and the spool, of a brake means operatively associated with said spool and comprising a drum, and a brake band in the form of a coiled spring cooperating with said drum, means for drivingly connecting the spool and drum, the coils of the brake band being fixedly anchored in the reel and frictionally engaging said drum so that the unwinding rotation of the spool acts to expand the band and release the brake and the winding rotation acts to contract the band and engage the brake, and manually operated means for expanding the band and releasing the brake, whereby winding rotation may be imparted to the spool by the driving spring.

14. The combination in a spring winding reel, of a spool staff, a spool rotatable thereon, a driving spring operatively associated with said spool, a winding drum for said spring operatively associated with said staff at one end thereof, a friction ratchet drum at the opposite end of said staff, a sleeve concentric with said ratchet drum, a spirally coiled spring friction ratchet member secured at one end to said sleeve and embracing said ratchet drum and normally in friction clutching engagement therewith, the coils of the ratchet member being disposed so that the stress of the driving spring acts to engage the ratchet member, and a manually operated means associated with the free end of said ratchet member for manually releasing the same.

15. The combination in a spring winding reel, of a spool staff, a spool rotatable thereon, a driving spring operatively associated with said spool, a winding drum for said spring connected to the spring, means for drivingly connecting the spring with the spool, a friction ratchet drum rotatable relative to said staff, means for drivingly connecting said winding and ratchet drums, a spirally coiled spring friction ratchet member anchored at one end and embracing said ratchet drum and normally in friction clutching engagement therewith, the coils of the ratchet member being disposed relative to the ratchet drum so that the stress of the driving spring acts to engage the ratchet member, and a manually operated means associated with the free end of said ratchet member for manually releasing the same.

16. The combination in a spring winding reel, of a spool, a staff therefor, a driving spring operatively associated with said spool, a winding drum for said spring connected to said staff, a friction ratchet drum connected to one end of said staff, a sleeve concentric with said ratchet drum, a spirally coiled spring friction ratchet member secured at one end to said sleeve and embracing said ratchet drum and normally in friction clutching engagement therewith, the coils of the ratchet member being disposed so that the stress of the driving spring acts to engage the ratchet member, and a manually operated means associated with the free end of said ratchet member for manually releasing the same.

17. The combination in a spring winding reel, of a spool, a staff therefor, a driving spring, means drivingly connecting said spring with said spool, releasable means for preventing rotation of said spool by said spring, a winding member connected to said spring, a friction ratchet drum connected to said winding member and rotatable relative to said staff, a spirally coiled spring friction ratchet member anchored at one end and coacting with said ratchet drum and normally in friction clutching engagement therewith, the coils of the ratchet member being disposed so that the stress of the driving spring acts to engage the ratchet member to prevent rotation thereof, and a manually operated means for manually releasing the ratchet member.

18. The combination in a fishing reel comprising a spool and a driving spring, of a brake means operatively associated with said spool comprising a brake drum, and a spirally coiled spring brake band embracing said drum, said brake band being fixedly anchored at one end independently of the drum, the coils of the brake band encircling the drum so that the unwinding rotation of the spool acts to expand and release the brake band from the drum and the winding rotation acts to contract and engage the brake band with the drum, and manually operated means operatively associated with the free end of said brake band for expanding the band and releasing the brake, whereby the spool may be rotated in winding direction.

19. The combination with a fishing reel comprising a spool, of a brake means operatively associated with the spool comprising a brake drum and a fixedly anchored brake band having a plurality of laps embracing said drum and normally in frictional engagement therewith and disposed so that the unwinding rotation of the spool acts to expand and release the brake band from the drum and the winding rotation thereof acts to contract and engage the brake band with the drum, and manually operated means for expanding the band and releasing said brake, whereby the spool may be rotated in winding direction.

20. The combination in a fishing reel comprising a spool, of a brake means operatively associated with said spool comprising a brake drum, and a fixedly anchored spring brake band coacting with said drum, the brake band being disposed so that the unwinding rotation of the spool acts to expand the band to release the brake drum and the winding rotation acts to contract the band to engage the brake drum, and manually operated means for expanding the band and releasing the brake band for rotation of the spool in winding direction.

21. The combination with a fishing reel comprising a spool and a driving spring, of a brake means operatively associated with the spool comprising a brake drum and a fixedly anchored brake band embracing said drum and normally in frictional engagement therewith and disposed so that the unwinding rotation of the spool acts to expand the band to release the brake drum and the winding rotation thereof acts to contract the band to engage the brake drum, and manually operated means for releasing said brake band for rotation of the spool in winding direction.

22. The combination in a spring wind reel, of a casing comprising a cup-shaped body member, a spool within said casing, a driving spring operatively associated with said spool, a brake drum operatively associated with said spool, a brake band embracing said drum and anchored at one end, a slide cooperating with the free end of said brake band, said slide being disposed through an opening in the side wall of said casing member to project from the casing, a lever having a notch at its inner end engaging the edges of an opening in said casing whereby the lever is pivotally supported, and a spring member arranged through said opening for said slide and having lugs at its inner end disposing at the sides of the slide, said spring member being shouldered to engage within the casing whereby the spring member is supported, said lever having an arm slidably engaging an opening in said slide.

23. The combination in a spring wind reel, of a casing comprising a cup-shaped body member, a spool within said casing, a driving spring operatively associated with said spool, a brake drum operatively associated with said spool, a brake band embracing said drum and anchored at one end, a slide cooperating with the free end of said brake band, said slide being disposed through an opening in the side wall of said casing member to project from the casing, and a lever having an arm slidably engaging an opening in said slide.

24. The combination in a spring wind fishing reel comprising a spool and a driving spring, of brake means operatively associated with said spool comprising a brake drum, a spring brake band frictionally coacting with said drum, said band being anchored at one end, a slide coacting with the free end of said brake band, a brake releasing lever engaging said slide, and a spring acting on said brake releasing lever to urge said slide from brake releasing position.

25. The combination in a spring wind fishing reel, of a casing comprising a cup-shaped body member, a spool within said casing, a driving spring operatively associated with said spool, a brake drum operatively associated with said spool, a coiled spring brake band coacting with said drum, one end of the brake band being anchored, the brake band being disposed so that the unwinding rotation of the spool acts to release the brake and the winding rotation acts to engage the brake, a slide slidably disposed against the side wall of the casing and coacting with the free end of said spring and provided with a pair of spaced studs, a pivoted stop coacting with said slide to limit movement of the slide in one direction, a lever having a fulcrum engaging portion, said casing having a fulcrum thereon with which said lever is engaged, and a spring connected at its outer end to said lever and arranged through said casing in overlapping relation to said slide and provided with holes engaging said studs, said spring acting to hold the lever on its fulcrum and to retract said slide.

26. The combination in a spring wind fishing reel, of a casing comprising a cup-shaped body member, a spool within said casing, a driving spring operatively associated with said spool, a brake drum operatively associated with said spool, a coiled spring brake band coacting with said drum, the inner end of the brake band being anchored, its free end being provided with an out-turned lug, the brake band being disposed so that the unwinding rotation of the spool acts to release the brake and the winding rotation acts to engage the brake, a forked slide slidably disposed against the side wall of the casing and provided with a laterally projecting lug coacting with the lug at the end of said spring and provided with a pair of spaced studs, the inner stud being headed, a lever having a hooked fulcrum engaging portion, said casing having an outwardly offset fulcrum thereon with which said lever is engaged, and a spring connected at its outer end to said lever and arranged through said casing in overlapping relation to said slide and provided with a hole receiving its outer stud and with a slot engaging its headed stud, said spring acting to hold the lever on its fulcrum and to retract said slide.

27. The combination in a spring wind fishing reel, of a casing comprising a cup-shaped body member, a spool within said casing, a driving spring operatively associated with said spool, a brake drum operatively associated with said spool, a coiled spring brake band coacting with said drum, one end of the brake band being anchored, the brake band being disposed so that the unwinding rotation of the spool acts to release the brake and the winding rotation acts to engage the brake, a slide slidably disposed against the side wall of the casing and coacting with the free end of said spring and provided with a pair of spaced studs, a lever having a fulcrum engaging portion, said casing having a fulcrum thereon with which said lever is engaged, and a spring connected at its outer end to said lever and arranged through said casing in overlapping relation to said slide and provided with holes engaging said studs, said spring acting to hold the lever on its fulcrum and to retract said slide.

28. The combination in a spring wind fishing reel, of a support, a spool, a driving spring operatively associated with said spool, a brake drum operatively associated with said spool, a coiled spring brake band coacting with said drum and disposed so that the unwinding rotation of the spool acts to release the brake and the winding rotation acts to engage the brake, one end of said brake band being anchored, a brake releasing member coacting with the free end of said brake band, an engageable stop for said brake releasing member, a lever having a fulcrum portion detachably engaged with said support, and a spring connected at its outer end to said lever and detachably engaged with said brake releasing member, said spring acting to hold the lever on its fulcrum and to retract said brake releasing member.

29. The combination in a spring wind fishing reel, of a support, a spool, a driving spring operatively associated with said spool, a brake drum operatively associated with said spool, a coiled spring brake member coacting with said drum and disposed so that the unwinding rotation of the spool acts to release the brake and the winding rotation acts to engage the brake, one end of said brake band being anchored, a brake releasing member coacting with the free end of said brake band, said brake releasing member being mounted for selective brake releasing or retracting movement, a lever having a fulcrum portion detachably engaged with said support, and a spring connected at its outer end to said lever and detachably engaged with said brake releasing member, said spring acting to hold the lever on its fulcrum and to urge said brake releasing member to retracted position.

30. The combination in a spring wind fishing reel, of a spool, a driving spring operatively associated with said spool, a brake drum operatively associated with said spool, a coiled spring brake band normally frictionally coacting with said drum, one end of said brake band being fixedly anchored, so that the unwinding rotation of the spool acts to release the brake and the winding rotation acts to engage the brake, a brake releasing member coacting with the free end of said brake band, said brake releasing member being mounted for selective brake releasing or retracting movement, and a spring acting to urge said brake releasing member to retracted position.

31. The combination in a fishing reel, of a spool, a brake drum operatively associated with said spool, a spring brake band frictionally engaging said drum, one end of said brake band being fixedly anchored whereby the unwinding rotation of the spool acts to release the brake band from the drum and the winding rotation acts to engage the brake band with the drum, a brake releasing member coacting with the free end of said brake band, said brake releasing member being mounted for selective brake releasing or retracting movement, and means for urging said brake releasing member to retracted position.

SAMUEL G. RUSSELL.
FRANK BURDICK.